(No Model.)
J. J. BALLARD.
PLANTER.
No. 397,215. Patented Feb. 5, 1889.
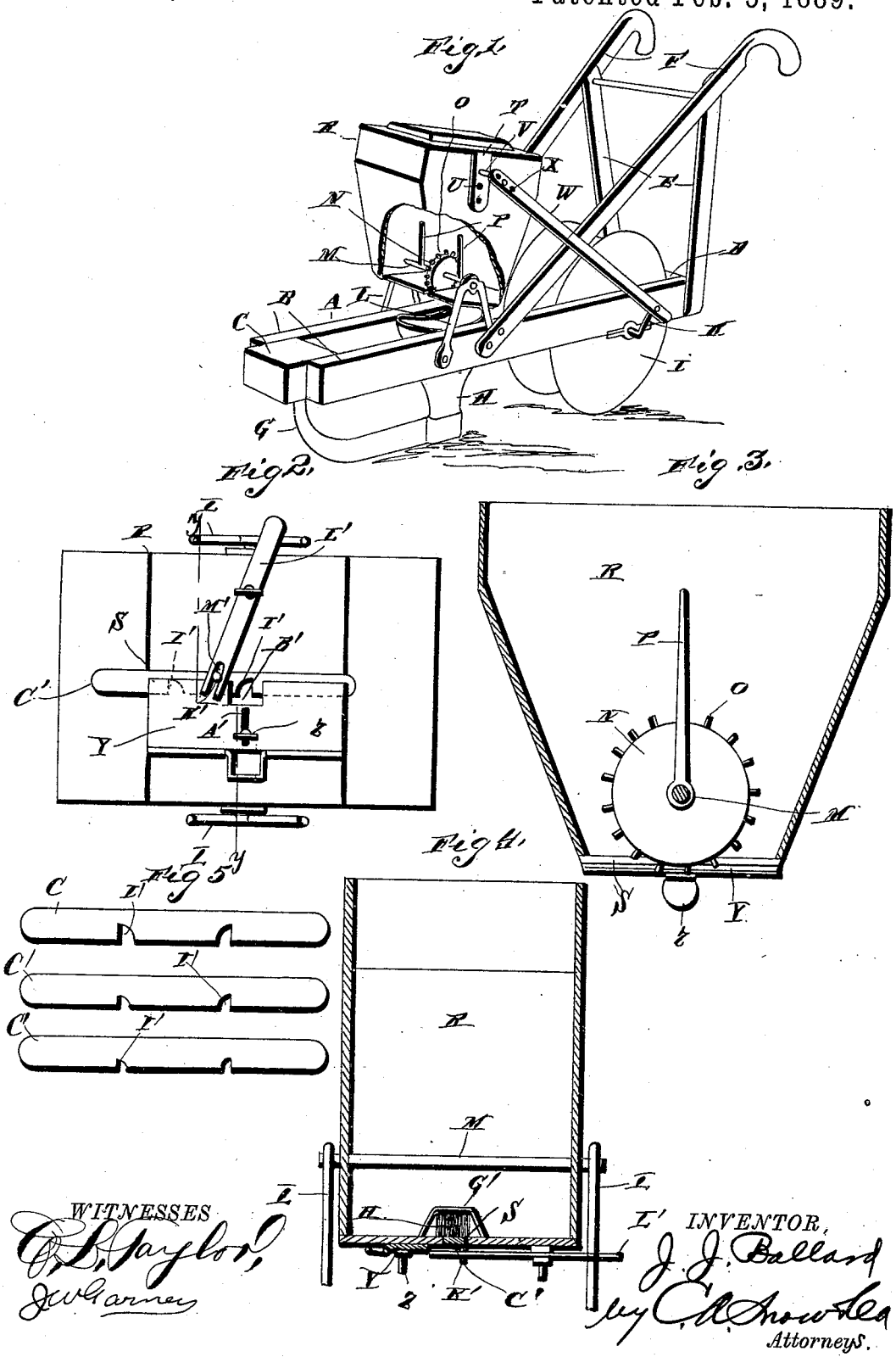

UNITED STATES PATENT OFFICE.

JOHN J. BALLARD, OF TERRELL, TEXAS.

PLANTER.

SPECIFICATION forming part of Letters Patent No. 397,215, dated February 5, 1889.

Application filed June 12, 1888. Serial No. 276,844. (No model.)

*To all whom it may concern:*

Be it known that I, JOHN J. BALLARD, a citizen of the United States, residing at Terrell, in the county of Kaufman and State of Texas, have invented a new and useful Improvement in Planters, of which the following is a specification.

My invention relates to an improvement in planters; and it consists in the peculiar construction and combination of devices, that will be more fully set forth hereinafter, and particularly pointed out in the claims.

In the accompanying drawings, Figure 1 is a perspective view of a planter embodying my improvements, with a portion of the hopper removed to disclose the interior mechanism. Fig. 2 is an inverted plan view of the hopper-bottom. Fig. 3 is a vertical longitudinal sectional view. Fig. 4 is a vertical transverse sectional view taken on the line $y\ y$ of Fig. 2. Fig. 5 shows a number of seed-slides, having openings of different sizes.

A represents the frame, which comprises the parallel side beams, B, the block C, connecting the front ends of the said beams, and the cross-bar D, connecting the rear ends thereof. From the rear corners of the frame rise a pair of standards, E.

F represents a pair of handles, which are similar to plow-handles and have their front ends bolted to the beams B, and are connected near their rear ends to the upper end of the standards E.

G represents a curved runner or furrow-opener, which is secured under the front end of the frame at the center thereof, and H represents the seed-spout, the lower end of which is connected to the rear end of the furrow-opener.

I represents a supporting-roller, which is journaled between the beams B, near the rear end of the frame, and the shaft of the said roller is provided at one end with a crank, K. The periphery of the roller is concave, as shown in Fig. 1, for the purpose to be hereinafter described. On the outer sides of the beams B, at a distance from the front end of the frame, are bolted inverted-U-shaped supporting bars or standards L.

M represents a rigid shaft which connects the upper sides of the said supporting-bars, and to the center of the said shaft is adapted to be secured a disk, N, which is illustrated in detail at Fig. 3, and is provided with peripheral teeth or fingers O.

P represents a pair of vertical stirrers or arms, which project from the upper side of the shaft M at a slight distance from opposite sides of the disk N, and said stirrers or arms, like the said disk, are adapted to be detached from the shaft.

R represents the hopper, which is journaled and is adapted to oscillate in a longitudinal direction on the shaft M. This hopper is provided in its lower side with a longitudinal opening, S, of suitable width, which is arranged directly under the disk N when said disk is secured to the shaft. On one side of the hopper is a vertical plate, T, which is provided with a vertical series of openings, U.

V represents a bolt which is adapted to be secured to either of the openings U, and projects outward from the hopper.

W represents a pitman, which has its rear end pivoted to the crank K, and is provided at its front end with a series of openings, X, which are adapted to receive the projecting bolts V, and thereby connect the front end of the pitman to the hopper and adjust the same with relation thereto.

On the bottom of the hopper, on opposite sides of the opening S therein, are secured slide-plates Y by means of set-screws Z, which operate in transverse slots A', with which the slides are provided, and adapt the said slide-plates to be adjusted laterally toward and from the opening S, so as to regulate the width of the said opening according to the quantity of seed that it is desired to sow to a given area. One of the slides Y is provided on its inner edge, at its center, with a rectangular opening, B'.

C' represents a seed-slide, which is arranged longitudinally under the opening S in the bottom of the hopper, and is guided by the opposing edges of the slides Y.

Within the bottom of the hopper is a bridge-bar, G', from the center of which depends a cut-off or brush, H'. The seed-slide is provided with a pair of openings or seed-cups, I', which are adapted to register successively with the brush when the seed-slide is reciprocated, as will be hereinafter described. From the said seed-slide, near its center, depends a stud, K'. On the under side of the hopper is arranged an operating-lever, L', which is pivoted on one of the set-screws Z, and hence is adapted to be readily removed from the hopper when necessary. The inner end of the said lever is provided with an open slot, M', which receives the stud K', and the outer end of the lever projects beyond one side of the hopper and between the arms of one of the supporting-bars L. It follows from this arrangement and the construction of parts that when the machine is in motion the rotation of the roller I communicates oscillating motion to the hopper by reason of the crank and pitman, and as the hopper oscillates the lever L' engages the arms of the bar L alternately, thereby causing the said lever to oscillate on the lower side of the hopper and impart reciprocating motion to the seed-slide, and thereby cause the latter to drop seeds from the hopper through the seed-spout into the furrow made by the runner, as will be readily understood.

In Fig. 5 I show a number of seed-slides having openings I' of different sizes and varying in number, and the said seed-slides are interchangeable and are adapted to be used for planting different kinds of seeds, as will be very readily understood. The disk N is of course detached from the shaft M when the machine is used, as before stated.

If it be desired to plant cotton-seeds, the seed-slide and the bridge-bar carrying the brush are removed from the hopper, together with the lever L', and the seed-disk N is secured to the center of the shaft M, the operation of the machine being then as described in Letters Patent of the United States No. 372,009, granted to me October 25, 1887, for a cotton-seed dropper, on which the hereinbefore-described planter is an improvement. The concave periphery of the roller I, which follows the furrow-opener, covers the seeds in the furrow and forms a ridge over them. By reason of the series of openings U the front end of the pitman may be attached to the hopper at different distances from the shaft on which the hopper oscillates, and thereby the movement of the hopper can be readily regulated.

Having thus described my invention, I claim—

1. The combination, in a planter, of the oscillating hopper having the opening S in its lower side, the slides Y on the bottom of the hopper, the seed-slide guided between said slides Y, the operating-lever L', pivoted on the bottom of the hopper, and the rigid arms secured to the frame of the planter or other fixed point and arranged in the path of the lever, substantially as described.

2. The combination, in a planter, of the oscillating hopper having the opening S in its lower side, the slides Y on the bottom of the hopper, having the slots A', the set-screws Z, engaging said slots and securing the slides in place, the seed-slide guided between the opposing edges of the slides Y, and the operating-lever L', pivoted on one of the screws Z and engaging the seed-slide, substantially as described.

In testimony that I claim the foregoing as my own I have hereto affixed my signature in presence of two witnesses.

JNO. J. BALLARD.

Witnesses:
C. C. WILSON,
J. M. TURNER.